May 30, 1961 D. E. GRISWOLD ET AL 2,986,167
MULTIPLE CONTROL FOR DISTRIBUTION SYSTEM
Filed July 2, 1957 9 Sheets-Sheet 1

INVENTORS
David E. Griswold
BY Paul W. Carsten
John D. Settles
Bacon & Thomas
ATTORNEYS May 30, 1961 D. E. GRISWOLD ET AL 2,986,167
MULTIPLE CONTROL FOR DISTRIBUTION SYSTEM
Filed July 2, 1957 9 Sheets-Sheet 2
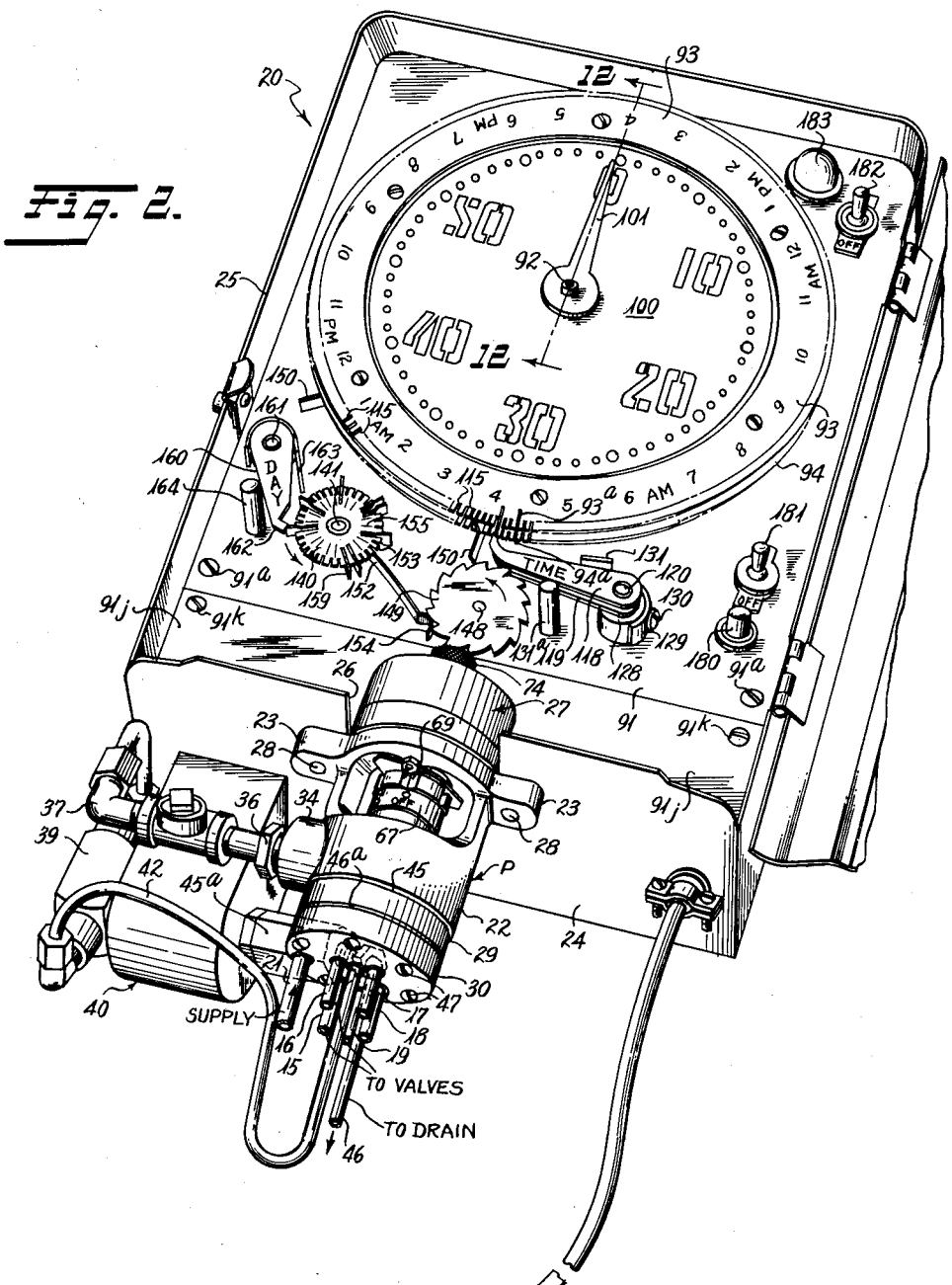
Fig. 2.
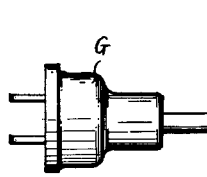
INVENTORS
David E. Griswold
BY Paul W. Carsten
John D. Settles
Bacon & Thomas
ATTORNEYS

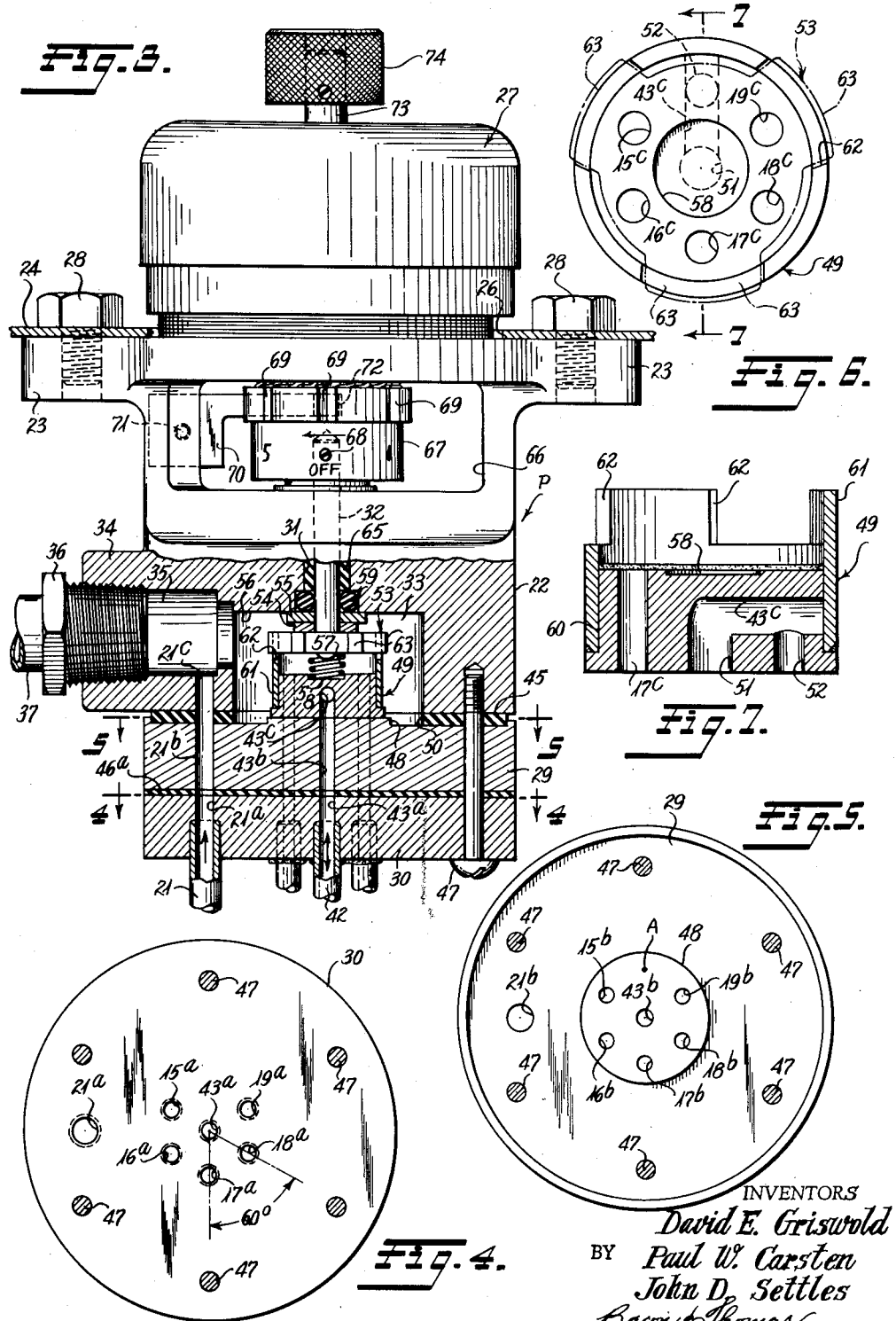

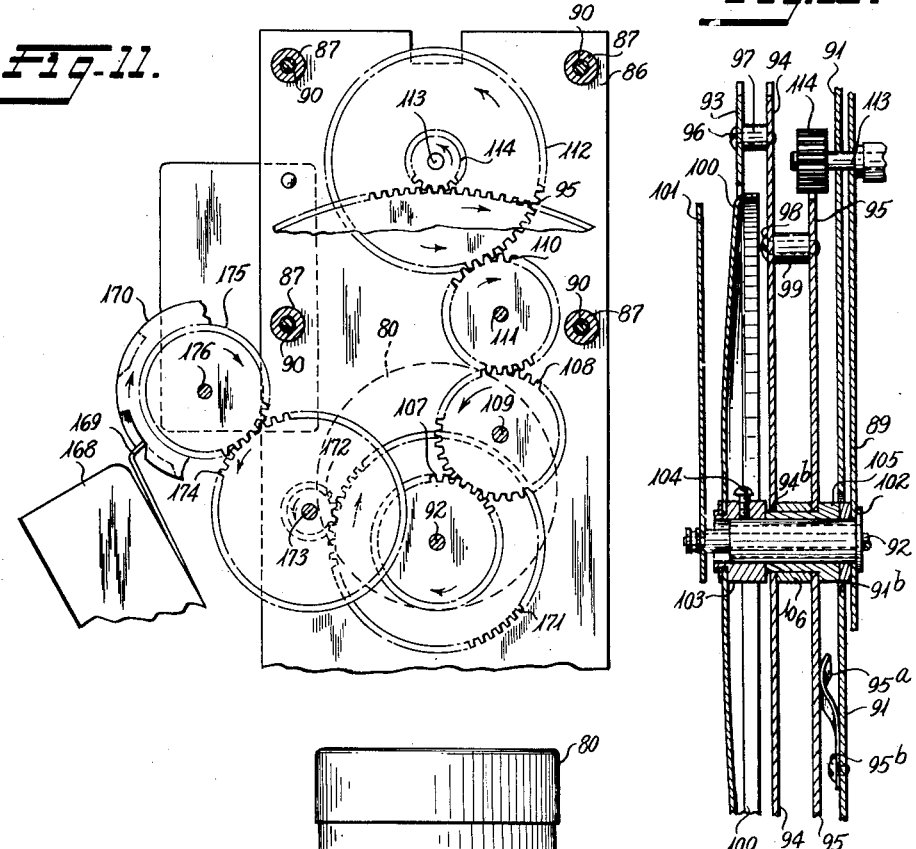

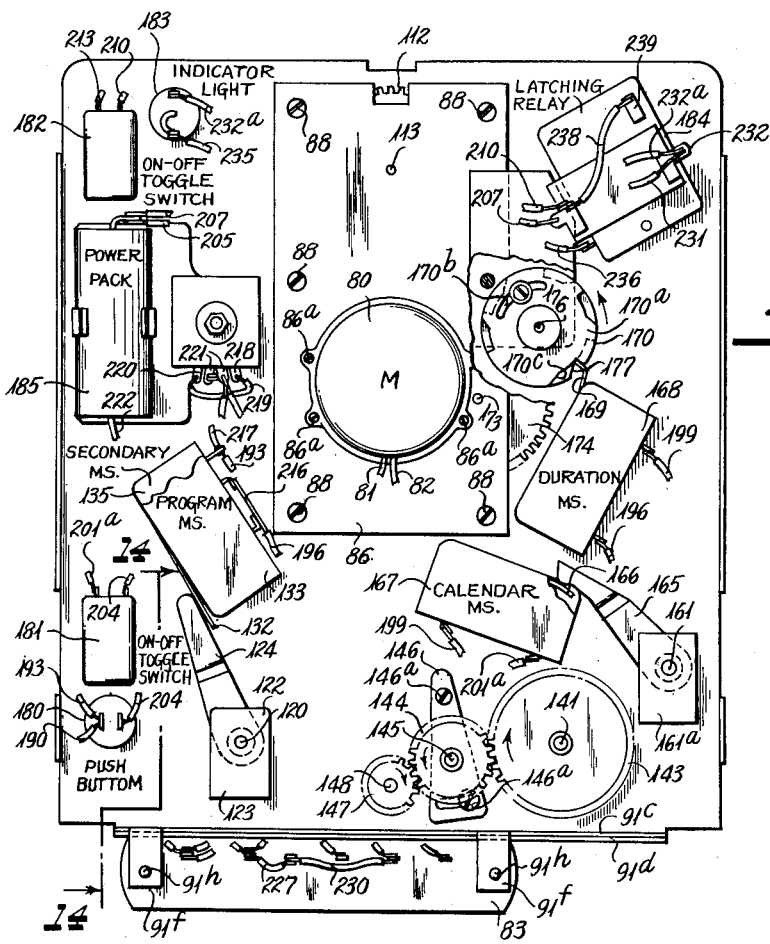
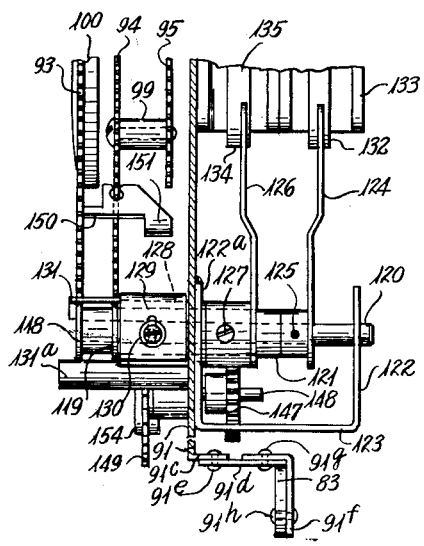

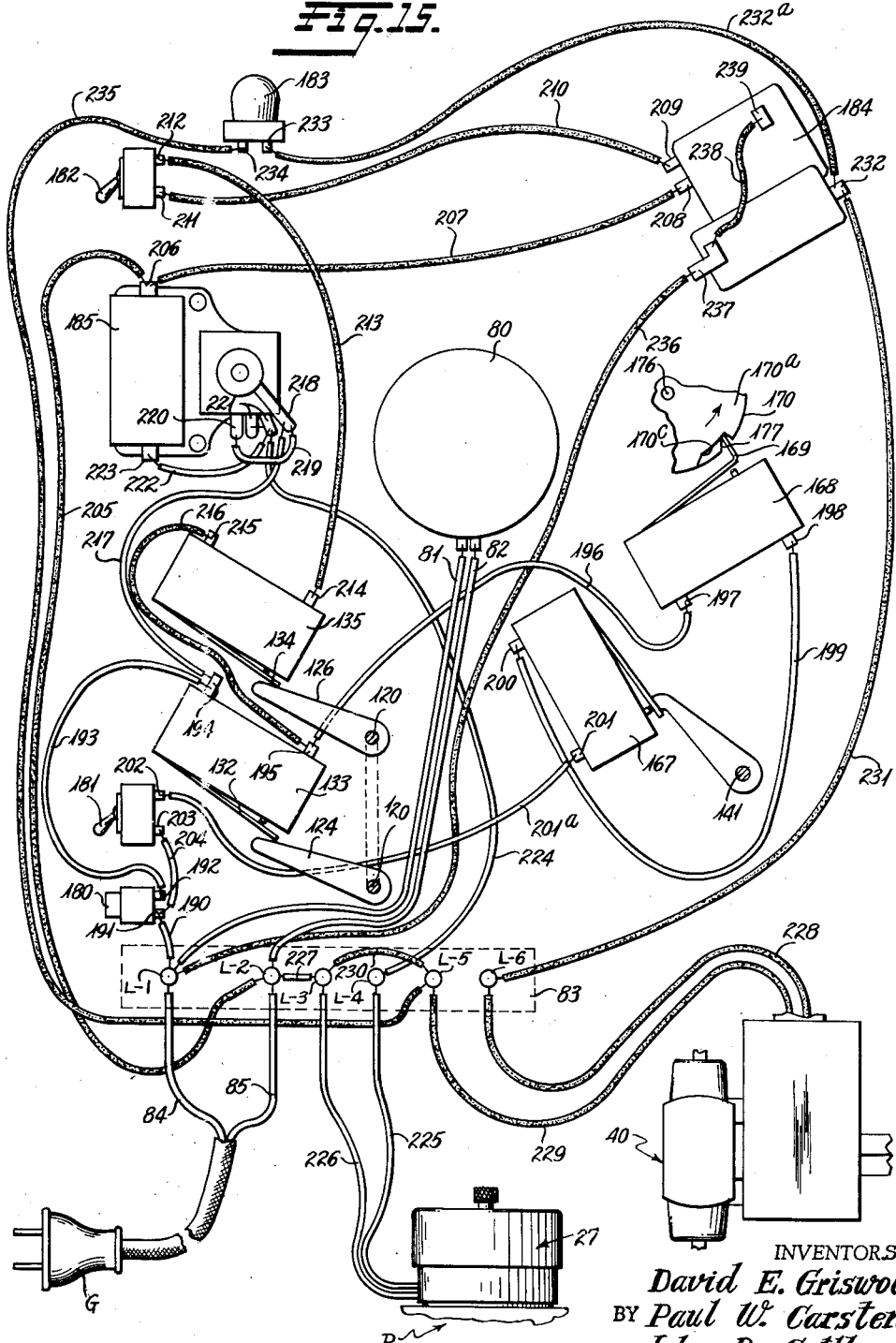

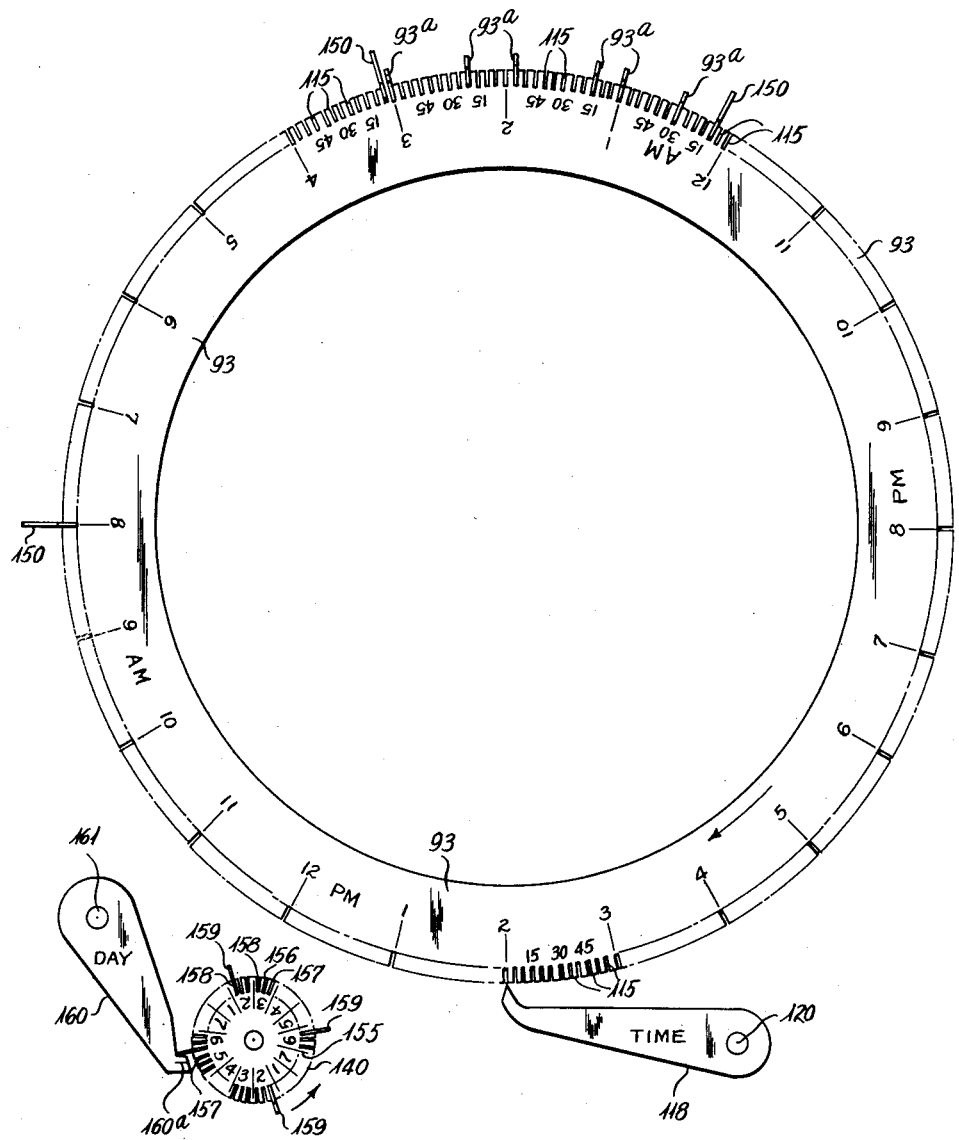

May 30, 1961 D. E. GRISWOLD ET AL 2,986,167
MULTIPLE CONTROL FOR DISTRIBUTION SYSTEM
Filed July 2, 1957 9 Sheets-Sheet 9

INVENTORS
David E. Griswold
BY Paul W. Carsten
John D. Settles
Bacon & Thomas
ATTORNEYS United States Patent Office 2,986,167
Patented May 30, 1961

2,986,167
MULTIPLE CONTROL FOR DISTRIBUTION SYSTEM

David E. Griswold, Newport Beach, Paul W. Carsten, Malibu, and John D. Settles, Garden Grove, Calif., assignors to Donald G. Griswold, Newport Beach, Calif.

Filed July 2, 1957, Ser. No. 669,659

14 Claims. (Cl. 137—624.16)

This invention relates to automatic control means for cyclically controlling the distribution of fluid, and more particularly to a multiple control unit for lawn sprinkling systems which makes it possible to schedule flow at any one station or area for any length of time, any number of times, on a daily schedule different from daily schedules of other stations, as desired.

Automatic sprinkling systems for lawns and the like generally include sprinkler heads distributed throughout the lawn or shrubbery area and in many instances the areas to be watered are of such extent that the usual water supply pipes are unable to provide sufficient pressure and volume of flow to operate all of the sprinkler heads simultaneously. It is customary, therefore, to arrange the sprinklers in groups, each group disposed to water a selected area. Usually each group of sprinklers is supplied by a single distribution pipe. The several distribution pipes are connected to a main supply line and controlled by separate pressure-actuated diaphragm valves that are selectively and successively operated to allow flow of water to any one of the distribution pipes. It is often desirable in irrigating areas to vary the time interval of watering to suit conditions or to suit particular landscaping.

According to the present invention, water to any given area may be supplied for any desired time interval from 5 minutes to any multiple of 5 minutes. It is also possible with the present control unit to plan a predetermined schedule of watering which may call for the skipping of watering of certain areas, on certain days, or for decreasing or increasing the time of watering of such areas on a cycle different from that previously set up on the same control for another day.

The fluid pressure operated valves controlling the flow of water to the sprinklers in different areas are themselves controlled by a station selector, which in the present control is a solenoid-operated, disc-type pilot valve, operated in response to schedules determined by program dials driven by electric time clock mechanism to preselect the time at which a given distribution pipe will be supplied with water and predetermined the length of time of supply of water to the given pipe. The present control unit can be preset to determine the time of day or night and the days of the week when the watering system is to be set into operation. Often it is preferred to water during the early hours of the morning when the demand on the water mains is least. Any predetermined watering cycle may be repeated several times without interruption, if desired, or the interval between successive cycles may be varied, as desired, within any 24-hour period, or from day to day.

Also, according to the present invention, the control unit may be set to effect watering on any preselected day or days of a 2-week period, before the whole cycle is repeated. For example, the control may be set to effect watering only on Monday and Thursday of one week and Tuesday and Saturday of the next week. Likewise, the control may be set to effect watering early in the morning on the selected Monday and during the late afternoon on Thursday, etc., as will be explained more fully hereinafter.

The station selector or pilot valve is subject to control by an electric clock driven program dial rigged to actuate a "Time" arm to close a daily program switch to effect energization of a rotary-type solenoid for turning the pilot disc, step by step, through a complete revolution.

The present control also includes a master shut-off control valve in the form of a solenoid-operated, 3-way valve arranged so that it will effect automatic closing of all distribution valves independently of any actuation of the pilot valve. The master control valve is associated with a second program dial rigged to actuate a Time arm to close a master valve control switch to effect energization of the master control valve to close all valves and maintain them closed for a given period of time and in this way accomplish skipping of watering at certain stations during certain time periods.

The daily program dials that control the pilot valve solenoid and the solenoid of the master valve are connected together in spaced relation and form "dual program dials" and when this term is used hereinafter it shall refer to such assembly.

The present control also includes a 14-day calendar dial, by means of which the days on which watering is to occur can be preselected by mounting program clips at appropriate points on the dial. A Day arm is associated with the calendar dial and is arranged to actuate a daily calendar or schedule selector switch. Thus, the control unit includes a daily time switch for the station selector (pilot valve), a daily time switch for the master control valve (3-way valve) and a daily schedule selector switch associated with the 14-day calendar dial.

The pilot valve directs line pressure to selected water distribution control valves to effect watering area by area or station by station. A conventional rotary solenoid drives a ratchet mechanism that advances the disc of the pilot valve one step with each impulse from the daily program switch. In the event of power failure, the selector control (pilot valve) can be advanced by turning a knob manually to rotate the pilot disc step by step. The manual control may also be used to skip watering of certain areas and advance the cycle to any desired point. The 3-way master valve is arranged so that when it is de-energized, spent operating fluid from a distribution valve that is allowed to open is exhausted through it. Upon energization of the master shut-off valve, it directs line pressure to the open valve and causes it to close without requiring any actuation or change in position of the disc of the pilot valve. The master shut-off valve responds to electrical impulses received through the master valve control switch.

The Time arms associated with the dual program dial are mounted upon the outer face of a panel below these dials and are spaced the same distance apart as the dials. The switches controlled by these Time arms are mounted on the inner side of the panel, and all of the elements of the control, with the exception of the pilot valve and the master 3-way valve, are enclosed in a cabinet that can be mounted remote from the watered areas.

The program clock includes a stationary 60-minute clock face that overlies the panel, and a clock minute-hand that moves over the clock face. The dual program dial is also disposed in front of the panel and is rotated through one complete turn every twenty-four hours and is calibrated to position A.M. and P.M. program clips in slots corresponding to 5-minute intervals of the clock. The end of the outermost daily program Time arm points to the time of day indicated by the front program dial. Program clips for controlling one or more desired watering cycles are inserted into the slots formed in the outer edges of the daily program dials to actuate the daily program Time arms. Three trip clips are mounted on the dual dial assembly to advance the calendar wheel three slots per day by actuating a ratchet wheel connected by gearing with the calendar wheel.

The calendar wheel itself is provided with slots to receive clips to engage and actuate a Day arm. The calendar wheel is calibrated so that three slots lie within each day division thereof. The Day arm is arranged to actuate a calendar switch that is connected in series with the day program switch and the master valve control switch.

A toggle switch is mounted on the panel near its lower end and when in its Off position, interrupts the circuit to both the solenoid-operated pilot valve and the solenoid-operated master valve.

The control unit also includes a push button switch arranged in the control circuit so that each depression of the push button produces an electrical impulse effective on the solenoid of the pilot valve to advance the disc of the pilot valve one step. Such electrical impulse is delivered to the pilot valve solenoid by an impulse time or duration control switch when both the Day arm and a Time arm are actuated simultaneously by program clips, and the minute-hand is on a 5-minute mark. In this connection, a timing disc is driven by the clock mechanism in such phase that it actuates the impulse duration control switch to closed position each time that the minute-hand is on a 5-minute mark. The actuation of the duration switch is such that the circuit to the solenoids is maintained closed for only a very short interval of time, preferably only about ten seconds, whereby to minimize the time that the solenoid coils are energized.

When the Day arm and the Time arm associated with the master valve control switch are depressed at the same time by program clips and the minute-hand is on a 5-minute mark, an impulse is delivered to an indicator light control switch or latching relay. Each impulse to the relay will turn a red indicator light on to show when the master control valve is actuated to close all valves, the light being lit only when the master valve is energized to close a distribution valve. When the indicator light is on, it indicates that all station or distribution valves are closed. When the indicator light is off, it indicates that the master control valve is deenergized and the distribution valves are under the control of the pilot valve.

A second toggle switch is mounted on the upper portion of the panel of the control device and when this switch is in its Off position, it disconnects the master valve control switch from the latching relay that controls the indicator light.

One of the features of the invention is that the control makes it possible to set a number of completely different watering schedules on the program dials, each schedule to hold automatically inoperative certain stations which are to be scheduled for watering at another time, if desired. Moreover, each individual schedule is adjustable to operate from one to fourteen times per 2-week period independent of the other schedules. The entire 2-week schedule and the length of "On" time for any valve, on any day, is readily visible on the daily program and calendar dials.

The principal object of the invention is to provide an automatic, versatile fluid distribution control apparatus that will effect flow through preselected pipes, in predetermined sequence, and for variable time intervals, and which is also capable of adjustment to skip flow through certain pipes and to effect flow through other pipes for any desired time interval.

A more specific object is to provide a control unit for a sprinkler watering system that can be pre-set to effect flow through preselected distribution pipes to given areas, in predetermined sequence, for predetermined time intervals, for preselected days, and which can be pre-set to skip watering of preselected areas, and vary the interval and time of watering, as desired.

Another object is to provide an automatic control for a sprinkler system that will make it possible to set up schedules of watering programs for at least one 2-week interval.

Another object is to provide an automatic control for a sprinkler system wherein any desired number of watering cycles may be set up with different watering periods, for different times on selected days of the week.

Another object is to provide automatic control means for a sprinkler system in which certain areas which are scheduled for watering on one day will be skipped on another day, although the watering of the remaining areas according to another schedule is unchanged.

Another object is to provide automatic control means for a sprinkler system wherein preselected control valves can be maintained closed to skip watering notwithstanding that the station selector control (pilot valve) may be in a position to effect watering.

Another object is to provide an automatic sprinkler control unit wherein means is provided for visually indicating that the skip watering control portion of the mechanism is in operation.

Another object is to provide an automatic sprinkler control device in which skip watering can be effected at the option of the user.

Another object is to provide a sprinkler control device that may be operated manually in the event of power failure, and wherein any given cycle may be advanced manually to omit distribution of water to one or more areas, if desired.

Another object is to provide an automatic pilot valve controlled sprinkler system, which will visually indicate the position of the disc of the pilot valve and the corresponding station at which watering is taking place.

Another object is to provide a sprinkler control unit that will visually indicate watering schedules set up for at least a 2-week period.

Other objects and features of the invention will become apparent from the following description taken in conjunction with the accompanying drawings, wherein:

Fig. 2 is a perspective view of the complete control unit;

Fig. 3 is an enlarged partial sectional view through the station selector or pilot valve;

Fig. 4 is a sectional view taken on line 4—4 of Fig. 3, particularly illustrating the passages for operating fluid formed in the distribution base;

Fig. 5 is a sectional view taken on line 5—5 of Fig. 3, showing the ports in the intermediate member through which operating fluid flows;

Fig. 6 is a plan view of the pilot valve disc, showing its five pressure ports and single exhaust port, and illustrating in dot-and-dash lines the manner in which a driver engages the disc for rotating the same;

Fig. 7 is a sectional view through the pilot disc taken on the line 7—7 of Fig. 6;

Fig. 9 is a view similar to Fig. 8 but illustrating the flow of operating fluid under pressure to the same distribution valve to close the same, when the master valve is energized;

Fig. 10 is a plan view of the panel assembly of the control device particularly showing the dual program dial and the driving mechanism for such dial;

Fig. 11 is a fragmentary sectional view showing the gear train for driving the dual program dial and for driving a timing disc which controls the length of the interval during which current flows to the various solenoid and relay devices in the control circuit, taken on the line 11—11 of Fig. 10;

Fig. 12 is a fragmentary sectional view taken on the line 12—12 of Fig. 2, showing the drive means for the clock hand and for the dual program dial;

Fig. 13 is a rear view of the control panel;

Fig. 14 is a fragmentary vertical sectional view taken on the line 14—14 of Fig. 13;

Fig. 15 is a schematic wiring diagram of the complete control unit;

Fig. 16 is a diagrammatic view illustrating the setting of program clips on the program dials and the calendar dial for effecting one cycle of operation.

Figure 1:
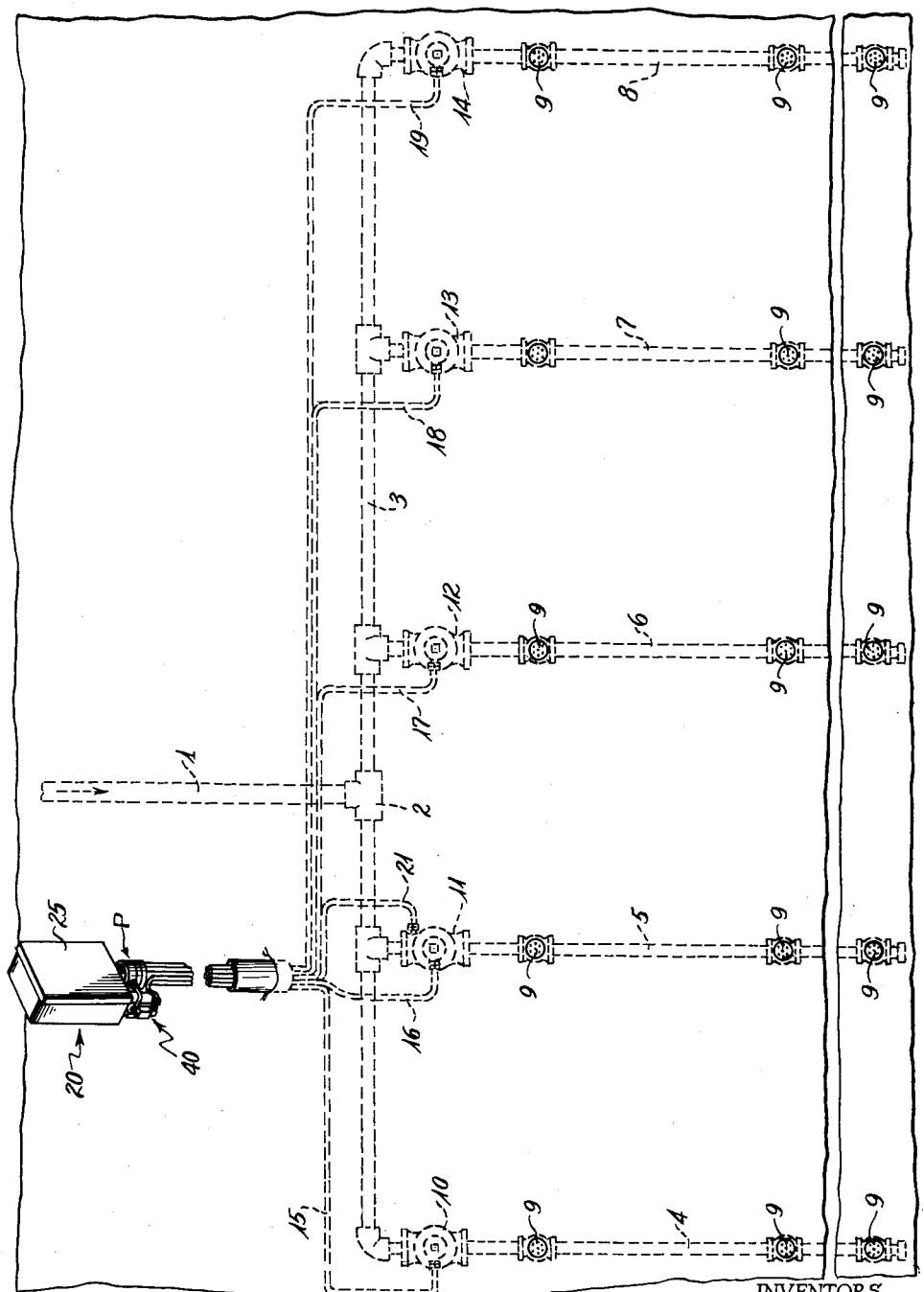
Fig. 1 is a diagrammatic view illustrating the present control unit associated with underground piping and sprinkler heads in a lawn area for effecting successive watering of different portions of said area.

Referring now to Fig. 1 of the drawings, the control device of the present invention is shown applied to a sprinkling system including an underground main water supply pipe 1 connected at one end to a suitable water supply source (not shown) and connected at the other end through a pipe T 2 and a header pipe 3 to a series of five underground distribution pipes designated 4, 5, 6, 7 and 8, respectively. Each of the pipes 4 to 8 is provided with a plurality of sprinkler heads 9 which project from the underground pipes to the surface of the area to be irrigated. The pipes 4 to 8 are also provided with fluid pressure operable diaphragm valves designated 10, 11, 12, 13 and 14, respectively, positioned near the connection of said distribution pipes with the header pipe 3. The diaphragm valves 10 to 14 are of a well-known type, which is closed by fluid pressure admitted into a pressure chamber above the diaphragm, and which automatically opens under line pressure when the operating fluid pressure above the diaphragm is relieved.

A series of tubes 15, 16, 17, 18 and 19 communicate with the diaphragm chambers of the valves 10 to 14, respectively, and are connected with a pilot valve P of a remote control unit, generally designated 20. It will be understood that the tubes 15 to 19 supply operating fluid to each diaphragm chamber or exhaust operating fluid therefrom in accordance with the control operations hereinafter described. An additional tube 21 is connected to the inlet side of valve 11 for supplying operating fluid at main line pressure to the pilot valve P. While the line 21 is shown connected to the valve 11, it will be understood that it could be connected at any point between the valves 10 to 14 and the main line 1, the inlet side of the valve 11 merely being a convenient place for this connection due to its proximity to the control unit 20 in the system illustrated.

The pilot valve P, Fig. 2, comprises a body 22 having flanges 23 extending from opposite sides thereof to engage the underside of the bottom wall 24 of a cabinet 25. A notch 26 is formed in the wall 24 to receive a rotary-type solenoid 27 which drives the pilot valve P. The assembly of the pilot valve P and rotary solenoid 27 is fixed to the wall 24 by cap screws 28 which are threaded into the flanges 23.

The pilot valve P is shown in greater detail in Figs. 3 to 7. It will be noted from these that in addition to the body 22, the pilot valve includes an intermediate or fluid distribution member 29 and a base 30, all preferably made of corrosion resistant metal. The body 22 is integral with the mounting flanges 23 and is provided with a bore 31 to receive a shaft 32. The body 22 is further provided with a pressure chamber 33 for operating fluid. A lateral boss 34 has a passageway 35 communicating with the pressure chamber 33. A reducer fitting 36 is mounted in the passageway 35 and is connected by piping generally identified by 37 to an opening 38 (Fig. 8) in the body 39 of a conventional 3-way, solenoid-operated master control valve 40. Another opening 41 in the body 39 is connected with one end of a tube 42, the other end of which communicates with a drain passage 43ª disposed axially in the base 30 of the pilot valve P.

The valve 40 has a third opening 44 in which is mounted a fitting 45ª having a drain tube 46 connected thereto. The purpose and function of the 3-way solenoid-operated valve 40 will be described in further detail hereinafter.

As is best shown in Fig. 3, a gasket 45 is disposed between the body 22 and intermediate member 29, and another gasket 46ª is disposed between the intermediate member 29 and the base 30. All of these parts have six openings in registration to receive screws 47 to hold the parts in assembled relation with the body 22.

The passages in the base 30 are best shown in Fig. 4, wherefrom it will be noted that five passages 15ª, 16ª, 17ª, 18ª, and 19ª, are arranged in radially spaced relation to the central drain passage 43ª and on radii 60° apart. The passages 15ª–19ª communicate with the tubes 15–19, respectively, which have one end thereof soldered or otherwise secured to the base 30 and conduct operating fluid to and from the valves 10–14, respectively. A relatively larger passage 21ª communicates with the pilot supply tube 21.

The porting of the intermediate member 29 is best shown in Fig. 5, wherefrom it will be noted than an axial drain port 43ᵇ has five radially spaced ports 15ᵇ, 16ᵇ, 17ᵇ, 18ᵇ, and 19ᵇ, disposed about the same on a radius equal to that upon which the ports 15ª–19ª are disposed, so that when the parts are assembled, the passages 15ª–19ª are in registration with ports 15ᵇ–19ᵇ, and the drain passage 43ª registers with the drain port 43ᵇ. A supply port 21ᵇ registers with the passage 21ª in the base 30 and with a passage 21ᶜ in the body 22 leading to passage 35 so that operating fluid can flow from the supply tube 21 to the pressure chamber 33. It will be understood from Fig. 3 that the gasket 46ª has corresponding registering ports. The space between the ports 15ᵇ and 19ᵇ is blank, and for identification purposes is indicated as position A.

The ports 15ᵇ–19ᵇ are formed in a circular raised seat 48 on the intermediate member 29. The gasket 45 has a central opening 50 which is substantially larger in diameter than the seat 48. This seat is engaged by a rotary pilot disc 49, see Figs. 6 and 7, which has five pressure ports 15ᶜ, 16ᶜ, 17ᶜ, 18ᶜ, and 19ᶜ extending therethrough. A U-shaped exhaust port 43ᶜ is also formed in the pilot disc 49 and has an axial leg portion 51 extending inwardly from its lower face, and a second leg portion 52 disposed the same distance from the axis of the disc as the ports 15ᶜ–19ᶜ. The leg portion 51 is in constant communication with the drain port 43ᵇ, whereas the leg portion 52 is adapted to successively register with ports 15ᵇ–19ᵇ.

The shaft 32 carries at its lower end a driver 53 adapted to drive the pilot disc 49. Thrust washers 54 and 55 are disposed between the driver 53 and the top wall 56 of the pressure chamber 33. A small compression spring 57 bearing against a seat 58 in the top of the disc 49 and against the bottom of the driver 53 holds the bottom face of the disc 49 in engagement with the top of the seat 48 of the member 29. The body 22 has a conventional O-ring 59 mounted therein and surrounding the shaft 32 to prevent leakage of pressure fluid from the chamber 33 along said shaft. The pilot disc 49, as is best shown in Fig. 7, is partially cut away, as at 60, to accommodate a tight skirt portion 61 which extends upwardly therefrom. The upper portion of the skirt 61 is provided with a plurality of notches 62 adapted to receive driving arms 63 of the driver 53 of the pilot drive shaft assembly, as shown in dot-and-dash lines in Fig. 6.

The shaft 32 extends upwardly through a bearing 65 into a recess 66 in the body 22. A head 67 is secured to the shaft 32 by a screw 68. The head 67 has six equally spaced V-shaped notches 69 formed at the upper end thereof, one notch corresponding to each of the positions of the pilot disc 49. The recess 66 extends completely through the body 22 so that the head 67 is visible from the front of the control unit 20, as is apparent from Fig. 2. The screw 68 is located in a position corresponding to the inactive position of the pilot valve P, and this position is indicated by the word "Off" which is shown stamped on the head 67. One notch 69 is aligned with the "Off" position of the head 67, and the remaining notches are aligned with other indicia, such as, the numerals "1," "2," "3," "4," and "5" to indicate which group of sprinklers 9 is in operation when a particular number appears at the central portion of the head, as viewed in Fig. 3. It will be noted, incidentally, that only the numerical indicia "1" and "5" appear on the drawings.

A flat leaf spring 70 is secured by a screw 71 to the rear side of the body 22. This spring has a bent end 72, which is complemental in shape to the V-notches 69, for successively engaging said notches. The spring 72 releasably holds the head 67, shaft 32, and pilot disc 49 indexed in any one of its six different positions.

The head 67 is rotated step-by-step by the rotary solenoid 27 previously referred to. Such solenoid is illustrated and described in detail in the application of David E. Griswold, Serial No. 464,989, filed October 27, 1954, now Patent No. 2,875,428, issued February 24, 1959, and does not, per se, constitute a novel feature of the present control apparatus. However, it is responsive to electrical impulses produced in accordance with program cycling determined by such apparatus.

The solenoid 27 includes a driven shaft 73, which is normally rotated by solenoid action, but nevertheless has a knob 74 secured to the upper end thereof to enable the shaft 73 to be manually rotated step-by-step to transmit rotation to the head 67, when desired. The construction of the rotary solenoid 27 is such that the shaft 73 can be rotated only in one direction. This shaft serves to drive the pilot disc shaft 32 in the same direction in a corresponding step-by-step movement.

Figure 8:
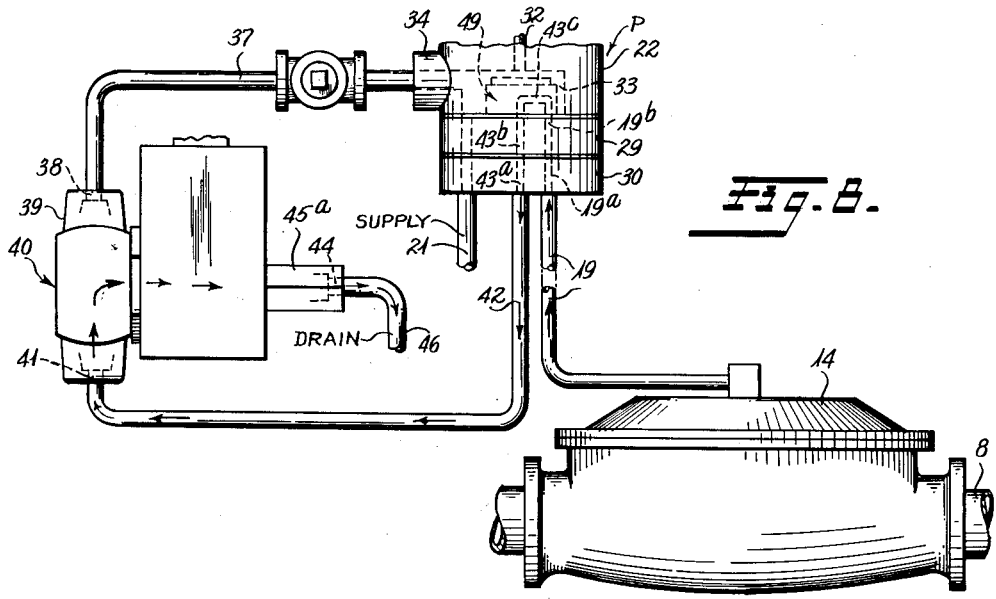
Fig. 8 is a diagrammatic view illustrating the direction of flow of spent operating fluid from one of the distribution valves when the solenoid-operated master valve is de-energized.
Figure 8:
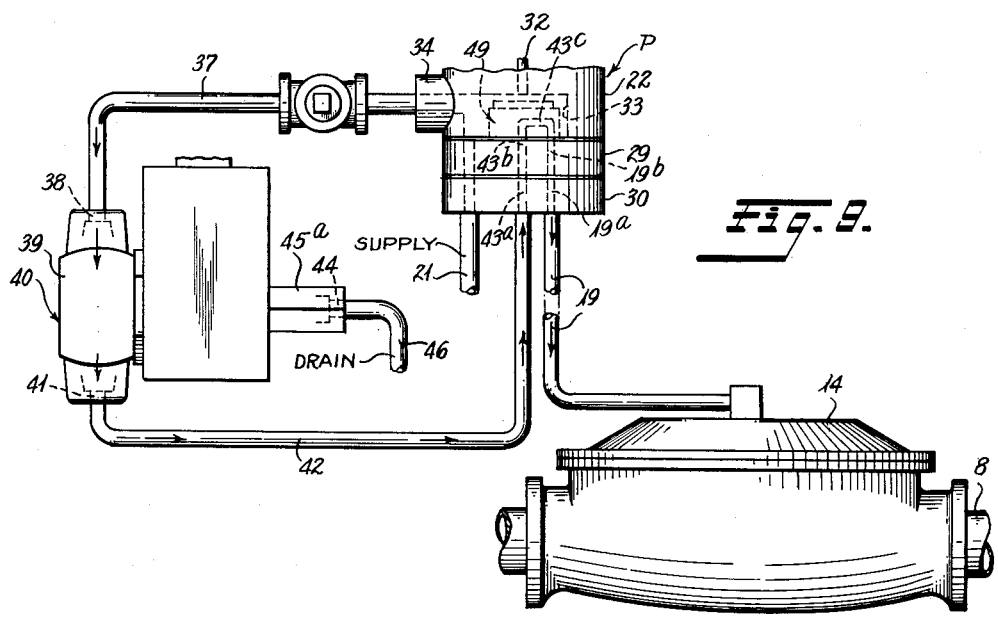

Figs. 8 and 9 diagrammatically illustrate the function of the solenoid-operated master control valve 40 in relation to the pilot valve P and in relation to valve 14 in distribution pipe 8, which has been shown for illustrative purposes. It will be understood, however, that the valve 40 functions in the same manner with respect to all of the remaining valves 10, 11, 12 and 13.

Fig. 8 shows the normal operation of the system during which the valve 40 is de-energized and operating fluid is drained by flow from the pressure chamber of the valve 14 through tube 19, passage 19$^a$ in base 30, port 19$^b$ in intermediate member 29, exhaust port 43$^c$ in the pilot disc 49, drain port 43$^b$ in member 29, drain passage 43$^a$ in base 30, tube 42, then into opening 41 and out opening 44 in body 39 of valve 40, for discharge to the atmosphere through the opening 44 and drain tube 46, as indicated by the arrows. At such time, the valve 14 is permitted to open and water flows through the pipe 8 to its sprinkler heads 9. All remaining valves 10, 11, 12, and 13 are subject to operating fluid pressure and are held closed.

Fig. 9 diagrammatically illustrates the operation of the master control valve 40 when it is energized through the control means to effect functions that will be described in more detail hereinafter. During energization, flow through the tube 42 is reversed, i.e., operating fluid under pressure will flow from the pressure chamber 33 of pilot valve P, through piping 37 into opening 38 and out opening 41 of the valve body 39, through tube 42, passage 43$^a$, ports 43$^b$, 43$^c$, and 19$^b$, passage 19$^a$ and tube 19 into the pressure chamber of valve 14 to effect closing thereof. In this way, the valve 14 can be made to close to interrupt watering or skip watering, without changing the position of the pilot disc 49. In other words, closing of the valve 14 is effected independently of any change in position of the pilot disc 49 of the pilot valve P.

It will be understood that the pilot disc 49 may be rotated clockwise through the shaft 32 to position its exhaust port 43$^c$ in vertical alignment with position A on the member 29. This really corresponds to a "0" (zero) position of the pilot valve, that is, a position in which the sprinkling system is shut off. In this position, none of the tubes 15 to 19 will be in communication with the tube 42, but will all be in communication with the chamber 33 through the pilot ports 15$^c$ to 19$^c$ and the registering ports 15$^b$ to 19$^b$ and passages 15$^a$ to 19$^a$ in the intermediate member 29 and base 30, respectively. Under these conditions, operating fluid under pressure is supplied to all of the tubes 15 to 19 and all valves 10 to 14 are held closed by water pressure from the main pipe 1.

When the shaft 32 is actuated to rotate the disc 49 clockwise as viewed in Fig. 6 through an angle of sixty degrees, or one-sixth of a revolution, the exhaust port 43$^c$ will be placed in communication with the port 19$^b$ and thus the tube 19 which is in communication with that port will be vented to the atmosphere through the valve 40, as previously described, and the valve 14 will be allowed to open. The pilot disc 49 is thereafter normally again rotated clockwise through another one-sixth revolution to again provide communication between the previously vented tube 19 and the chamber 33 to close the valve 14 and to vent the next tube 18 and open its corresponding valve 13. In this manner, the valves 10 to 14 may be sequentially permitted to open, whereby their corresponding sprinklers 9 will be effective to water predetermined portions of the lawn. In the course of a complete revolution of the pilot disc 49, each of the distribution pipes 4 to 8 will be supplied with water in any desired sequential order, depending upon the order in which the tubes 15 to 19 are connected with the passages 15$^a$ to 19$^a$, and thereafter all valves 10 to 14 will be closed when the exhaust port 43$^c$ again reaches its initial position A.

The means for controlling energization of the rotary solenoid 27 comprises a time control clockwork mechanism. This mechanism includes a synchronous motor 80 (Figs. 10, 13 and 15) operable by a suitable source of alternating electric current. Such current is supplied to the motor 80 through conductors 81 and 82, respectively, connected to terminals L-1 and L-2 (Fig. 15) mounted on a terminal strip 83. A main conductor 84 is connected to the terminal L-1 and another main conductor 85 is connected to the terminal L-2. The main conductors 84 and 85 are connected to a conventional electric plug G so that when the plug is inserted into a conventional socket, current is supplied to the motor 80 to make it run continuously.

The motor 80 is mounted upon a plate 86 (Fig. 13) by screws 86$^a$. Plate 86 is attached to one end of a series of spacers 87 (Fig. 10) by screws 88. The other end of the spacers 87 engages a plate 89, and screws 90 extend through a panel 91, through the plate 89, and are threaded into the spacers 87 to thus mount the clockwork mechanism on the rear side of said panel 91. The panel 91 is mounted in the cabinet 25 by screws 91$^a$ (Fig. 2) and underlying angle brackets (not shown) attached to the side walls of the cabinet. The motor 80 has a main shaft 92, which projects through the plate 89 and panel 91 and is arranged concentrically with a dual program dial assembly comprising a front daily dial 93, a back daily dial 94, and a driven gear 95. The dials 93 and 94 are secured together in axially spaced relation by screws 96 extending through spacers 97 between the dials. Similarly, the back dial 94 is secured to the gear 95 in axially spaced relation by screws 98 and intervening spacers 99. The front dial 93 is in the form of a ring which surrounds a clock dial 100; whereas, the back dial 94 is in the form of a disc. A clock hand 101 is secured to the shaft 92 and overlies the clock dial 100. The clock dial 100 has graduations, as shown in Fig. 2, to indicate sixty minutes, so that the clock hand 101 makes one complete revolution in an hour.

Referring to Fig. 12, the plate 89 has a sleeve 102 mounted thereon which extends through an opening 91$^b$ in the panel 91. The dial 100 has a hub 103 secured to the sleeve 102 by a set screw 104. The gear 95 is fixed to a hub 105 rotatably mounted upon the sleeve 102. The hub 105 has a reduced end portion that projects into a central opening 94$^b$ in the back dial 94 and a spacer 106 is mounted on the hub portion 105 between the gear 95 and the back dial 94. The motor shaft 92 which carries the hand 101 extends through the sleeve 102.

A main drive gear 107 (Fig. 11) is secured to the motor shaft 92 and meshes with a gear 108 on shaft 109. The gear 108, in turn, meshes with a gear 110 on shaft 111. The gear 110 meshes with a relatively large gear 112 fixed on a shaft 113. A pinion 114 is fixed on the shaft 113 in front of the panel 91 and meshes with the dual program dial drive gear 95. Thus, a drive is continuously transmitted from the motor shaft 92 to the gear 95 through the gear train described above. Two springs 95ª have one end fastened to the panel 91 by screws 95ᵇ and their other ends frictionally engaged with the adjacent face of the gear 95 to place a slight drag thereon and assure a uniform, controlled speed of rotation. The ratio of the gears is such that the gear 95, and the front dial 93 and back dial 94 connected therewith, are driven through one complete revolution every 24 hours. Accordingly, the front dial 93 is divided into twenty-four 1-hour periods, as best shown in Figs. 2 and 16, with the numerals 1 to 12 positioned one one-half of the dial marked A.M., and similar numerals positioned on the other half of the dial marked P.M. The hour graduations on the front dial 93 are further subdivided into 5-minute intervals by slots 115, adapted to receive program clips 93ª, as will be described more fully hereinafter. The back dial 94 is provided with program clip slots 116, which register exactly with the slots 115, so that program clips 94ª can be mounted in the same radial position on both dials, if desired.

A "Time" arm 118 (Fig. 2) is arranged to be engaged by program clips 93ª carried by the front dial 93 and a "Time" arm 119 is similarly arranged for engagement by program clips 94ª carried by the back dial 94. The arm 118 (Fig. 14) is fixed to one end of a shaft 120 that is rotatably mounted in a bushing 121 which extends through the panel 91. The other end of the shaft 120 is journaled in one leg 122 of a U-shaped bracket 123. The other leg 122ª of this bracket is welded to the inner face of the panel 91. A lever 124 is fixed to the shaft 120 by a screw 125. The arm 119 is secured to the outer end of the bushing 121, and a lever 126 is secured by a screw 127 to the bushing 121 adjacent the bracket leg 122ª. The bushing 121, in turn, is rotatably mounted in a sleeve 128 projecting outwardly from the panel 91. In this way, the Time arms 118 and 119 are mounted for rotary movement independently of each other. A stop member 129 is adjustably mounted upon the sleeve 128 by a screw 130 threaded into said sleeve. The stop 129 includes a portion 131 that overlies the arms 118 and 119 to limit the extent of their movement toward the program dials 93 and 94. The adjustment of the stop portion 131, however, is such that the Time arms 118 and 119 will be engaged by any program clip mounted in the slots of the program dials, but will not engage the periphery of the dials themselves with any appreciable pressure. A post 131ª mounted on the panel 91 limits movement of the arms 118 and 119 in a direction away from the program dials 93 and 94.

The arm 124 (Figs. 13 and 15) engages a spring arm 132 that actuates a daily program microswitch 133 in accordance with program clips 93ª mounted in the front dial 93. On the other hand, the arm 126 engages a similar spring arm 134 of a master valve switch 135 to actuate said switch in accordance with the positioning of program clips 94ª on the back dial 94. The spring arms 132 and 134, respectively, act through the levers 124 and 126 to urge the Time arms 118 and 119 toward the program dials 93 and 94, respectively. The switch 133 controls the operation of the solenoid 27 associated with the pilot valve P and the switch 135 controls the solenoid-operated master control valve 40, as will be explained more fully hereinafter.

A calendar dial 140 (Figs. 2 and 10) is fixed to a shaft 141 rotatably mounted in a sleeve 142 carried by the panel 91. A gear 143 (Fig. 13) is secured to the other end of the shaft 141 at the inner side of the panel 91 and meshes with a gear 144 mounted on a stub shaft 145 carried by a bracket 146 secured by screws 146ª to the panel 91. The gear 144 meshes with a pinion 147 secured to a shaft 148. The shaft 148 projects through the panel 91 and a ratchet wheel 149 is mounted on said shaft in a plane disposed inwardly of the back program dial 94. The ratchet wheel 149 has fourteen teeth and is rotated by trip clips 150 that are mounted in registering slots in the program dials 93 and 94. Each trip clip 150 includes an extension 151 that is moved in the path of the ratchet wheel 149, as will be understood from Fig. 14. The function of each trip clip 150 is to move the ratchet wheel 149 through an angle equal to that occupied by one tooth. A spring arm 152 (Fig. 2) has one end fixed at 153 to the panel 91 and its other end 154 engaged with a space in the ratchet wheel 149 to hold the ratchet wheel in position after it has been tripped by a trip clip 150.

Figure 17:
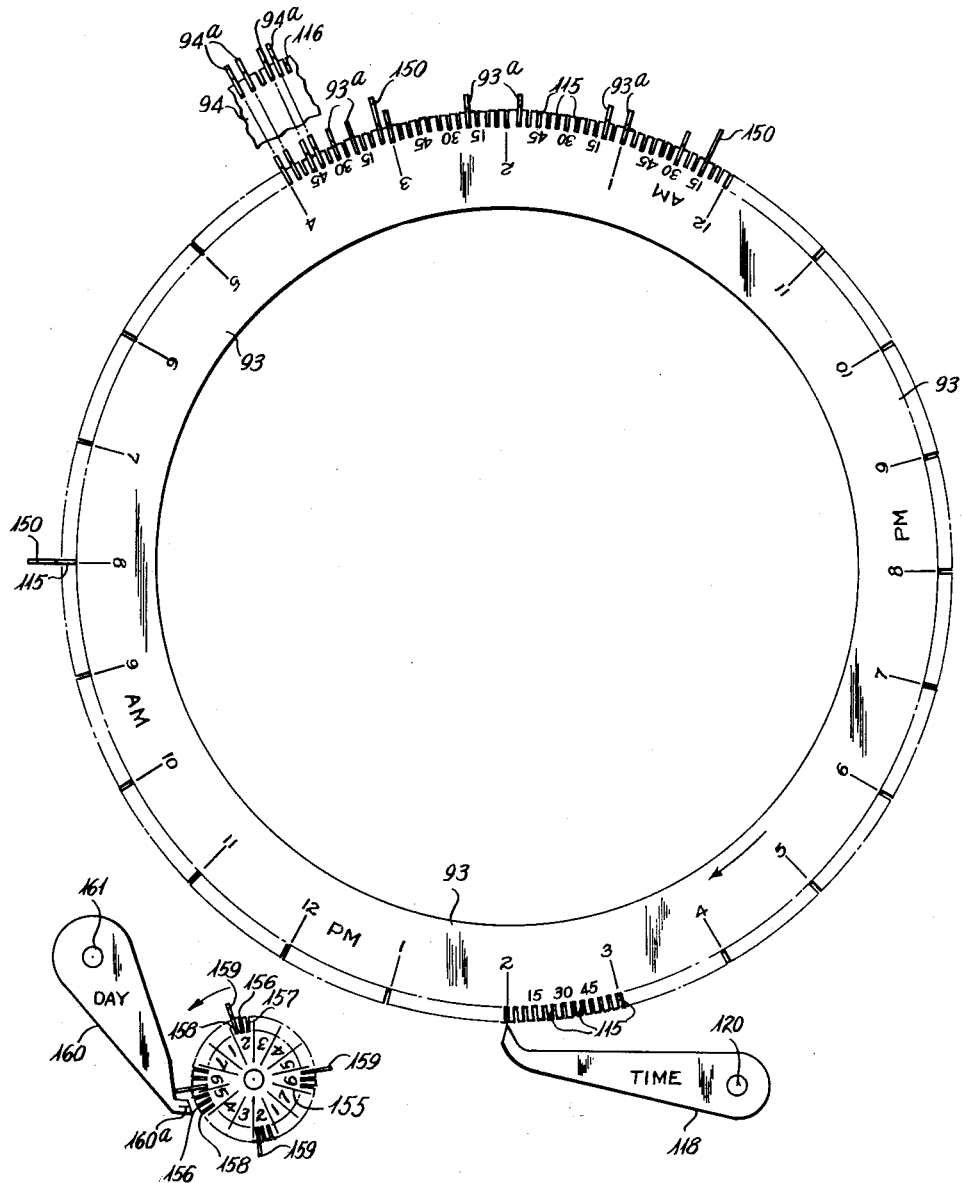
Fig. 17 is a similar view but showing the program clips arranged to effect a second cycle of operation.

The calendar dial 140 is best illustrated in Figs. 2, 16 and 17, from which it will be noted that the face of the calendar dial is divided into fourteen equal parts and has fourteen graduations 155 scribed thereon, the spaces defined by the graduations on one half of the dial being numbered 1 to 7 corresponding to the days of the week. Thus, the fourteen spaces correspond to a two weeks' program. Each space is provided with a central slot 156 radially aligned with a numeral on the dial 140. A slot 157 is disposed clockwise of the central slot 156 and a slot 158 is disposed counterclockwise of said central slot. A total of 42 slots is formed in the periphery of the calendar dial 140, with equal spacing between the slots.

It is pointed out at this time that the ratchet wheel 149 drives the calendar dial 140 through the gearing 147, 144 and 143 in a 3-to-1 ratio, that is, the ratchet wheel 149 makes three revolutions to one revolution of the calendar dial 140. This means that every time the ratchet 149 is tripped, the calendar dial 140 is rotated through an angle equal to the spacing between two adjacent slots in its periphery. Accordingly, the daily program dials are provided with three trip clips 150 to assure that the ratchet wheel 149 is tripped three times for each complete revolution of the program dials 93 and 94. In other words, such tripping of the ratchet wheel 149 assures that the calendar dial 140 will be rotated through an angle corresponding to a 1-day period, as marked on said dial. Each of the slots 156, 157 and 158 in the dial 140 is adapted to receive a program clip 159, depending upon the watering schedule desired. Operating examples of the setting of the program clips in the daily program dials 93 and 94 and in the calendar dial 140 will be set forth hereinafter.

The calendar dial 140 is rotated counterclockwise as viewed in Fig. 2, and the program clips 159 mounted thereon engage a Day arm 160 mounted upon a shaft 161 which extends through the panel 91 and through a bracket 161ª at the rear of said panel. The Day arm 160 has an end 162 that is successively contacted by the clips 159 as the calendar dial 140 is rotated. Movement of the arm 160 toward the calendar dial 140 is limited by a stop 163, similar in construction and in mounting to the stop 129. Movement of the arm 160 in a direction away from the calendar dial 140 is limited by a post 164 mounted on the panel 91. A lever 165 (Fig. 13) is mounted on the shaft 161 at the inner side of the panel 91. The arm 165 engages a spring arm 166 that closes a calendar switch 167 mounted on the inner side of the panel 91. It will be understood that the resilience of the spring arm 166 tends to urge the end 162 of the Day arm 160 toward the calendar dial 140.

An impulse duration control switch 168 (Fig. 13) is also mounted on the inner side of the panel 91 adjacent the clockwork driven gear mechanism. This switch includes a spring arm 169 that is actuated by a timing wheel 170 driven from the clock motor 80. Thus, a gear 171 (Fig. 11) is fixed to the driven shaft 92 of the clock motor 80 and meshes with a pinion 172 fixed to the shaft 173. A gear 174, which is also fixed to the shaft 173, meshes with a gear 175 fixed to the shaft 176. The timing wheel 170 previously referred to is fixed to this same shaft. The drive ratio of the gear train 171, 172, 174, and 175 is such that the timing wheel 170 is driven through one complete revolution in five minutes. The timing wheel 170 has a notch 177 (Fig. 13) which receives the end of the spring arm 169 of the duration switch 168. A disc 170ª is adjustably mounted on the wheel 170 by a screw and slot arrangement indicated at 170ᵇ. The disc 170ª has a notch 170ᶜ that can be positioned relative to the notch 177 to effect an accurate calibration of the length of time that the switch 168 is closed. The rotation of the timing wheel 170 is correlated with the rotation of the hand 101 of the clock so that the notch 177 receives the end of the spring arm 169 of the duration switch 168 only at a time when the clock hand 101 is in registration with the 5-minute graduations on the clock dial 100. Since the program clips 93ª and 94ª must be set for 5-minute intervals, it will be apparent that the switches 133, 135 and 168 are simultaneously closed.

The timing wheel 170 thus makes it possible to provide a fine calibration for the length of time that electrical current is available for actuating the pilot solenoid 27, the solenoid of the master control valve 40 and for resetting a latching relay 184, which will be referred to later. It will be understood that the duration switch 168 is allowed to close only at a time when the end of the spring arm 169 enters the notch 177 in the timing wheel 170 and remains closed only until the end of the arm is forced out of the notch by rotation of the timing wheel. This interval is preferably calibrated so that it has only a 10-seconds duration. Thus, current is supplied to the coils of the solenoids and reset relay for only an extremely short interval of time. This feature prolongs the life of the solenoid and relay coils. It also provides for precise and accurate timing of the operation of the pilot solenoid 27 and the solenoid-operated master control valve 40.

The electrical circuit for the control unit 20 is diagrammatically illustrated in Fig. 15. As is here shown, the terminal contact L-1 is connected by a conductor 190 with one terminal 191 of a push button switch 180. The other switch terminal 192 is connected by a conductor 193 to one terminal 194 of the daily program switch 133. The other terminal 195 of this switch is connected by a conductor 196 to a terminal 197 of the current-duration control switch 168. The other terminal 198 of the switch 168 is connected by a conductor 199 to a terminal 200 of the calendar switch 167. The other terminal 201 of the switch 167 is connected by a conductor 201ª to one terminal 202 of an Off-On toggle switch 181. The other terminal 203 of the switch 181 is connected by a conductor 204 with the terminal 191 of the push button switch 180.

The terminal contact L-2 on the terminal strip 83 is connected by a conductor 205 to a terminal 206 on a conventional power pack 185. Another conductor 207 connects this terminal with a terminal 208 of a conventional latching relay 184. Another terminal 209 of the relay 184 is connected by a conductor 210 to one terminal 211 of an Off-On toggle switch 182. The other terminal 212 of this switch is connected by a conductor 213 to one terminal 214 of the switch 135 that controls the master valve 40. The other terminal 215 of the switch 135 is connected by a conductor 216 to the terminal 195 of the switch 133.

The terminal 194 of the switch 133 is connected by a conductor 217 with a contact 218 of the power pack 185. The contact 218 is connected by a conductor 219 with another contact 220 of the power pack 185. Contacts 221 of the power pack are connected together and connected by a conductor 222 to a terminal 223 of the power pack 185. The contacts 221 are also connected by a conductor 224 with a terminal L-4 on the terminal strip 83. The contact L-4 is connected by a conductor 225 to one side of the solenoid 27 associated with pilot valve P. The other side of this solenoid is connected by a conductor 226 with a terminal L-3 on the terminal strip 83. The terminal L-3 is connected by a conductor 227 to the terminal L-2 and, thus, is connected with the main conductor 85.

One side of the solenoid of the master valve 40 is connected by a conductor 228 to a terminal L-6 on the terminal strip 83 and the other side of the solenoid is connected by a conductor 229 to a terminal L-5 on the terminal strip 83. Terminal L-5 is connected by conductor 230 with the terminal L-3 so that, in effect, it also is connected with the main conductor 85. The terminal L-6 is connected by a conductor 231 to a contact 232 on the latching relay 184 and this same contact is connected by a conductor 232ª to one terminal 233 of a red indicator light 183. The other terminal 234 of the light 183 is connected by a conductor 235 with the terminal L-5. The terminal L-1 is connected by a conductor 236 to another terminal 237 of the relay 184 and this terminal is connected by a conductor 238 with still another contact 239 of said relay.

Referring to Figs. 2, 13, and 15, the push button switch 180 is shown mounted at the lower right hand corner of the panel 91. The switch 180 is shown connected in series with the Off-On toggle switch 181, which is mounted on the panel 91 directly above it. This switch 181 is connected in a series with the calendar switch 167, the current-duration switch 168, the daily program switch 133, and the master valve switch 135. When the switch 181 is in its On position it is possible to manually cycle the pilot valve P by operating the push button switch 180. Each time the push button switch 180 is actuated, an electrical impulse is supplied to the solenoid 27 to turn the pilot disc 49 through an angle of sixty degrees. In this way, the control can be manually set to position the pilot valve in any desired starting position.

The Off-On toggle switch 182 is mounted on the panel 91 near its upper end and this switch controls the supply of electric current to elements of a skip watering circuit, including the solenoid of the master valve 40. The indicator light 183 is mounted on the panel 91 near the switch 182 and is lit whenever the skip circuit is effective, that is to say, whenever the master valve 40 is energized. The light 183 is controlled by the latching relay 184, which is constructed so that it will turn the light 183 off and on upon successive actuations of the relay. In other words, when the master valve 40 is energized the relay 184 is energized to maintain a holding circuit to the indicator light 183 to maintain said light lit and the solenoid of the master valve energized to effect skip watering. When the skip watering period is over, the latching relay is again energized, but this time it interrupts the circuit to the master valve 40 and also to the indicator light 183 and the light goes out to show that the system has been restored to control by the pilot valve 33. The power pack 185 is mounted on the inner face of the panel 191 and converts alternating current into direct current for actuating the rotary solenoid 27, the master solenoid valve 40, and the latching relay 184.

In Fig. 15, those conductors which control the elements that effect skip watering have been stippled to distinguish the same from the remainder of the conductors comprising the circuit for controlling the pilot valve without the skip watering feature. Thus, it will be noted that the switch 182, the indicator light 183, the master valve switch 135, the master valve 40, and the latching relay 184 are all interconnected by such stippled conductors. It will also be noted that the daily program switch 133 and the master valve switch 135 are connected in series by a stippled conductor 216.

In using the aforedescribed control means, a daily program with no skipped positions can be scheduled by inserting one program clip 93a in the front dial 93 for each position of the pilot valve P at which watering is desired, day or night. A clip 93a is also mounted in the zero or "Off" position. Thus, in the present device with five watering positions, six clips 93a must be inserted for one complete cycle. A trip clip 150 is inserted in the dials 93 and 94 in the fourth slot before the first program control clip 93a, or in other words at an interval 20 minutes ahead of the first clip. Another trip clip 150 is inserted immediately following the last program clip 93a in the cycle.

In order to set the weekly program with no skipped positions, a program clip 159 is inserted in the calendar dial 140 counterclockwise from the day on which watering is desired. The numerical stampings on this dial consisting of the numerals 1 to 7, correspond to the seven days of the week, in which the first day may be considered to be Sunday. It will be noted that the dial 140 is divided into fourteen spaces, thus providing for a 2-week time period. The toggle switch 181 must be closed in order for the control to automatically carry out the scheduled watering cycle.

It is possible to automatically skip any portion of the area to be watered by setting up a second complete operating cycle at some other time of day than the first cycle, and this is done by inserting program clips 94a in the program dial 94 in the same manner as described in connection with the setting up of the daily program with no skipped positions. The second cycle is started at least 20 minutes after the trip clip 150 following the first cycle. A program clip 94a is inserted in the back dial 94 at a time corresponding to the beginning of a skipped period and another program clip 94a is inserted in said dial at the end of the skipped period. If two or more consecutive pilot disc positions are to be skipped, only two clips are used on the back dial, one at the beginning of the first position and the other at the end of the last position.

In order to effect skip operation, the upper toggle switch 182 must be in its "On" position. The control will then operate on the skipping cycle and the indicator light 183 will glow only while a position is being skipped. The circuit for the skip control can be rendered ineffective simply by actuating the toggle switch 182 to its "Off" position.

In order to set the calendar dial 140 to automatically skip certain positions, a program clip 159 is inserted in said dial counterclockwise from the day on which the first cycle is desired. Another program clip 159 is inserted in the dial 140 clockwise from the day on which the second cycle is desired. If both cycles are desired in one day, a clip 159 is inserted in the slots on both sides of the numeral stamped on the dial to indicate particular days.

The clock mechanism is set by turning the clock hand 101 clockwise until the correct time of day is indicated by the indicia on the front dial 93 at a point in registration with the end of the Time arm 118. The calendar dial 140 is set in advance of the time at which a trip clip 150 engages the ratchet wheel 149. The number of 12-hour periods between the time the setting is being made and the next watering period are counted and one is added to this number if the period is less than 12 hours. The calendar dial 140 is turned counterclockwise until there are the same number of spaces between a line 160a on the Day lever 160 and the first program clip as there are 12-hour periods as determined by the foregoing. The number of spaces is increased by one if the next watering period is to be on the second cycle.

The following examples will serve to illustrate the application of the principles stated above to the setting up of typical watering cycles on the control unit 20:

*Example No. 1.—(No skipped positions)*

Assume that is is desired to water all areas of the lawn twice a week during the early hours of the morning, on Monday and Friday, and that the watering periods corresponding to the different positions of the pilot disc 49 are to be as follows:

No. 1 position—Water On at 12:30 A.M. and Off at 1:00 A.M. (30 minutes)
No. 2 position—Water On at 1:00 A.M. and Off at 1:15 A.M. (15 minutes)
No. 3 position—Water On at 1:15 A.M. and Off at 1:55 A.M. (40 minutes)
No. 4 position—Water On at 1:55 A.M. and Off at 2:20 A.M. (25 minutes)
No. 5 position—Water On at 2:20 A.M. and Off at 3:00 A.M. (40 minutes)

Pilot disc returned to Off position at 3:00 A.M.

The setting of the program clips 93a to effect the above schedule is graphically illustrated in Fig. 16. Thus, it will be noted that program clips 93a are inserted in the front program dial 93 in slots 115 corresponding to time indications of 12:30, 1:00, 1:15, 1:55, 2:20, and 3:00—all on the A.M. side of the dial. Trip clips 150 are inserted at positions corresponding to 12:10 and 3:05 A.M. A third trip clip 150 is inserted beyond the 3:05 A.M. position, say at 8:00 A.M., to insure that the calendar dial 140 will be moved three steps during a 24-hour period. Since the foregoing constitutes only one cycle, it is the first cycle and, therefore, a program clip 159 is placed in the calendar dial 140 in the first slot 158 counterclockwise from the numeral "2" (both occurrences) for Monday and the numeral "6" (both occurrences) for Friday.

Assuming that this watering program is being set up on Thursday afternoon at 2:00 P.M., the clock hand 101 is turned until the arm 118 marked "Time" points to 2:00 P.M. on the dial 93. The number of hours from this time counterclockwise on the dial 93 to the first trip clip 150 is 10 hours and 10 minutes (considering the time between 2:00 P.M. Thursday and 12:10 A.M. Friday when the cycle is to start). This is a partial 12-hour period so that only one space must be left between the program clip 159 for Friday's operation on the calendar dial 140 and the line 160a on the "Day" lever 160. Accordingly, one program clip 159 is inserted in the slot 158 opposite the day marked "6" (Friday) on the dial 140, and a clip 159 is positioned in the same location on the day marked "2" (Monday) on said dial. The calendar dial 140 is manually turned counterclockwise until the slot 157 opposite day "5" (Thursday) on the dial 140 registers with the line 160a and the control is ready to begin its automatic operation. At this time only the toggle switch 181 must be in its "On" position.

With the program clips 93a inserted in the front dial 93, as illustrated in Fig. 16, it will be apparent that as the dial 93 rotates clockwise, the trip clip 150 will engage the ratchet wheel 149 and trip it and cause the calendar dial 40 to advance one step and engage the clip 159 with the Day arm 160 to close the calendar switch 167. Thereafter, the first clip 93a will engage the Time arm 118 and rock the lever 124 to close the switch 133. At the same time, the duration switch 168 will be closed by the timing wheel 170 and an electrical impulse will be delivered to the pilot valve solenoid 27 to turn the pilot disc 49 from its "Off" to its No. 1 position so that distribution valve 14 corresponding thereto will be opened and water will flow through the distribution pipe 8 to water the area serviced thereby. It will also be apparent that as the program clips 93ª successively engage the Time arm 118, the circuit to the pilot valve solenoid 27 will be momentarily completed and additional electrical impulses will be transmitted to the solenoid 27 to rotate the pilot disc 49 step by step until it completes its cycle. After the cycle has been completed, the trip clip 150 following the last program clip 93ª of the cycle will again trip the ratchet 149 and advance the calendar dial 140 through another step, thereby moving the program clip 159 on the calendar dial 140 past the end of the Day arm 160 to open the calendar switch 167. When the trip clip 150 at the 8:00 A.M. position trips the ratchet 149, the calendar dial 140 will be advanced another step. According to the program set up by the calendar dial 140, it will not be again actuated until the program clip 159 associated with the number "2" marking on said dial 140 engages the Day arm 160 on Monday, at which time the same cycle determined by the program clips 93ª will be repeated at the same hours of the morning.

*Example No. 2.—(With skipped positions)*

Assume that it is desired to water all areas of the lawn on Monday morning exactly at the times selected in Example No. 1, but that on Friday morning the No. 3 and No. 5 positions are to be skipped entirely and position Nos. 1, 2, and 4 are to be cut down to 10 minutes each. To accomplish this, a second cycle is set up, as follows:

No. 1 position—Water On at 3:20 A.M. and Off at 3:30 A.M. (10 minutes)
No. 2 position—Water On at 3:30 A.M. and Off at 3:40 A.M. (10 minutes)
No. 3 position is skipped. (Takes 5 minutes)
No. 4 position—Water On at 3:45 A.M. and Off at 3:55 A.M. (10 minutes)
No. 5 position is skipped. (Takes 5 minutes)
Pilot disc returned to Off position at 4:00 A.M.

The setting of the program clips to accomplish the second cycle is diagrammatically illustrated in Fig. 17. Thus, additional program clips 93ª are inserted in the front dial 93 in slots 115 corresponding to time positions of 3:20, 3:30, 3:40, 3:45, 3:55, and 4:00—all on the A.M. side of the dial 93. In order to skip the No. 3 position, program clips 94ª are inserted in slots 116 in the back dial 94 at positions corresponding to 3:40 and 3:45 A.M. To skip the No. 5 position, program clips 94ª are placed in slots 116 in the back dial 94 at the 3:55 and 4:00 A.M. positions. A program clip 159 is placed in slots 158 counterclockwise from the number "2" graduations on the calendar dial 140 to select the first cycle on Monday. Another program clip 159 is placed clockwise of the number "6" graduations in slots 157 on the calendar dial 140 to select the second cycle on Friday. Assuming that the second cycle is being set up at the same time of day as the first cycle, namely, at 2:00 P.M. on Thursday, the number of hours from this time to the next trip clip 150 is the same as before, 10 hours and 10 minutes (from 2:00 P.M. Thursday to 12:10 A.M. Friday). This again is a partial 12-hour period, so one space is called for between the program clip for Friday's operation on the calendar dial 140 and the line 160ª on the "Day" lever 160. However, since the Friday operation is the second cycle, one additional slot must be added, so the calendar dial 140 is then turned until two slots appear between the line on the "Day" lever 160 and Friday's program clip 159. In other words, the dial 140 is positioned with the slot 156 of graduation "5" opposite the line 160ª on the Day arm 160.

With the switches 181 and 182 closed, and with the additional program clips 93ª inserted in the dial 93, and with the clips 94ª inserted in the dial 94, as illustrated in Fig. 17, it will be apparent that as the dial 140 is turned for Friday's operation, the clip 159 will engage the Day arm 160 and close the switch 167, as before described. The dials 93 and 94 as they rotate clockwise, will cause the program clips 93ª of the second cycle (3:20 A.M. to 4:00 A.M.) to engage the Time arm 118 and rock the lever 124 to close the switch 133 in the same manner previously described. However, the program clips 94ª engage the Time arm 119 and rock the lever 126 to close the master valve switch 135. This will complete the circuit to the solenoid of the master valve 140 and will energize the valve during the 3:40 and 3:45 A.M. period and permit flow of operating fluid to the distribution valve 12 to maintain it closed and thus skip watering at the No. 3 position of the pilot disc. A similar action will take place when the program clips 94ª at the 3:55 to 4:00 A.M. position on the dial 94 actuate the Time arm 119 to again energize the solenoid of the master valve 40 to effect closing of the valve 10 to skip watering at the No. 5 position of the pilot disc.

Thus, the cycle on Fridays will be modified to cut down the watering periods at the No. 1, 2 and 4 pilot valve positions to 10-minute intervals and skip watering entirely at the No. 2 and 5 positions of the pilot valve.

While the present control apparatus has been described in connection with certain watering schedules, it will be understood that numerous other watering schedules can be effected by properly positioning the program clips 93ª and 94ª on the daily program dials 93 and 94, and by properly positioning program clips 159 on the calendar dial 140.

It will also be understood that although a pilot valve and distribution system have been disclosed wherein only five distribution valves are utilized, the pilot valve can be modified by adding additional ports and tubes to control additional valves.

It will be further understood that various changes may be made in the details of construction and in the arrangement of the components comprising the present control unit 20 without departing from the principles of the invention or the scope of the annexed claims.

We claim:

1. A control system including a series of water distribution pipes; a normally closed pressure-responsive distribution valve connected in each pipe; a movable pilot valve, means to connect said pilot valve to said distribution valves for controlling successive opening and closing of said distribution valves; means for actuating said pilot valve through successive positions of operation to successively condition said distribution valves to open and close to effect flow successively through said pipes; and time-controlled means connected in series with said pilot valve and said distribution valves for selectively causing a distribution valve when conditioned to open in a given position of said pilot valve, to remain closed without change in said given position of said pilot valve.

2. A control system as defined in claim 1, in which the means connected with the pilot valve and distribution valves is a master valve movable to a position to deliver operating fluid to the conditioned distribution valve to cause it to remain closed.

3. A control system as defined in claim 2, in which the master valve is a 3-way valve connected with the pilot valve and said distribution valves and is selectively operable to allow the discharge of spent operating fluid from the conditioned distribution valve, or to deliver operating fluid under pressure to said conditioned distribution valve to cause it to close.

4. A pilot valve having a pressure chamber for operating fluid; a movable pilot disc in said pressure chamber, said pilot disc having a pressure port means to move said disc; and an exhaust port; a normally closed fluid pressure-operable flow control valve, connecting means between said pilot valve and said flow control valve; said flow control valve having a pressure chamber adapted to be alternatively placed in communication with said pressure and exhaust ports of said pilot disc to effect closing and allow opening, respectively, of said flow control valve; and a time-controlled master valve connected in series with said pilot valve and said flow control valve and operable to selectively allow the discharge of spent operating fluid through said exhaust port from the pressure chamber of said flow control valve to open the valve, or to supply operating fluid under pressure through said exhaust port to said pressure chamber of said flow control valve to cause the same to remain closed.

5. Control means for a distribution system including a series of distribution pipes, normally closed flow control valves connected in said pipes, and a pilot valve including connections for successively controlling opening and closing of said flow control valves, comprising: means for actuating said pilot valve to control all of said flow control valves for effecting a predetermined valve actuation schedule; and time-controlled means connected in series with said pilot valve and said flow control valves for modifying said actuation schedule by retaining closed at least a preselected one of said flow control valves which would normally be opened under the control of said pilot valve in carrying out said predetermined actuation schedule.

6. Control means for a distribution system including a series of distribution pipes, flow control valves connected in said pipes, and a solenoid-operated pilot valve including connections for successively controlling opening and closing of said flow control valves, comprising: means including an electrical circuit for actuating said solenoid-operated pilot valve to control said flow control valves to provide a given valve actuation schedule; and time-controlled means in series with said pilot valve including a different electrical circuit for selectively modifying the control exercised by said pilot valve by causing skip actuation of at least one of the flow control valves normally controlled by said pilot valve, without requiring actuation of said pilot valve.

7. A distribution system including a series of water pipes; a pressure-responsive flow control valve connected in each distribution pipe; a solenoid-operated pilot valve movable to successive operative positions including connections for controlling successive opening and closing of said flow control valves; a program dial having elements thereon for providing a selected valve actuation schedule; switch means connected in circuit with said solenoid-operated pilot valve and including connections actuatable by said elements to complete the circuit to said pilot valve for effecting movement of said pilot valve to said successive operative positions; a second program dial having elements thereon for providing a different valve actuation schedule under the control of said pilot valve; a switch including connections actuatable by the elements on said second program dial; means for simultaneously moving said dials; and a solenoid-operated master valve connected in circuit with said second switch and also including connections with said pilot valve and operable to modify the effect of said pilot valve to vary the valve actuation schedule established by the elements on said first dial.

8. A distribution system as defined in claim 7, including means connecting the program dials together in spaced relation, and an arm, connected to said switches and disposed to be actuated by the elements on each program dial, to effect closing of the switch associated with the respective dials.

9. Control means for a distribution system including a series of distribution pipes, flow control valves connected in said pipes, and a solenoid-operated pilot valve including connections for successively controlling opening and closing of said flow control valves, comprising: a program dial including connections for controlling the operation of said solenoid-operated pilot valve; switch means, including connections actuated by said program dial, and connected in a circuit with said solenoid-operated pilot valve; a second program dial; a solenoid-operated master valve including connections with said pilot valve for modifying the control thereof over said flow control valves; a master valve switch including connections actuated by said second program dial and including connections with said master valve in a second circuit different from that controlled by said first program dial; and a separate manual switch including connections for controlling each circuit, whereby said second circuit may be optionally rendered effective.

10. Control means for a distribution system including a series of distribution pipes, flow control valves connected in said pipes, and a solenoid-operated pilot valve including connections for successively controlling opening and closing of said flow control valves, comprising: a daily program dial having elements thereon for providing a selected valve actuation schedule; electric time clock means connected to drive said program dial; means including a program switch having connections to be actuated by said elements on said program dial, said switch being connected in circuit with said solenoid-operated pilot valve for effecting movement thereof to successive operative positions for controlling successive opening and closing of said flow control valves; a calendar dial having elements thereon for controlling the operation of said valve actuation schedule for selected days; means including a switch having connections actuated by the elements on said calendar dial; a timing wheel driven by said electric clock in predetermined phase relation to the position of the elements on said daily program dial and on said calendar dial; a current-duration switch connected to be closed at a predetermined time by said timing wheel; and conductors connecting said program switch, calendar switch, and current-duration switch in series, whereby when all three of said switches are closed an electrical impulse will be delivered to said solenoid-operated pilot valve to actuate the same from one position to another.

11. Control means as defined in claim 10, including a manually-operated switch connected in series with said program switch, calendar switch, and current-duration switch.

12. Control means as defined in claim 10, including a second daily program dial connected to be rotatable simultaneously with the first-mentioned daily program dial and having valve actuation schedule control elements thereon arranged in registration with similar elements on said first-mentioned program dial for setting up a different valve actuation schedule from that set up by the elements on said first mentioned daily program dial; means including a switch actuatable to closed position by the elements on said second daily program dial; and means connected in circuit with said last-mentioned switch for selectively reversing a flow of fluid through said pilot valve to omit actuation of the flow control valve in certain of said distribution pipes.

13. Control means as defined in claim 12, wherein the means for selectively reversing a flow through said pilot valve includes a solenoid-operated master valve connected in circuit with said last-mentioned switch and operable for omitting flow control valve actuation and maintaining the valve closed that has been conditioned by said pilot valve to be opened.

14. Control means as defined in claim 13, including an indicating light including connections for indicating times when said solenoid-operated master valve is energized.

References Cited in the file of this patent

UNITED STATES PATENTS

| 746,998 | Schmidt | Dec. 15, 1903 |
| 2,000,367 | Williamson et al. | May 7, 1935 |
| 2,318,969 | Reynolds | May 11, 1943 |
| 2,360,321 | Griswold | Oct. 17, 1944 |
| 2,372,324 | Hauser | Mar. 27, 1945 |

(Other references on following page)

UNITED STATES PATENTS

| | | | |
|---|---|---|---|
| 2,391,718 | Lindemann | Dec. 25, | 1945 |
| 2,495,462 | Lassiter | Jan. 24, | 1950 |
| 2,498,189 | Wattson | Feb. 21, | 1950 |
| 2,545,928 | Martin et al. | Mar. 20, | 1951 |
| 2,569,432 | Halford | Sept. 25, | 1951 |
| 2,583,397 | Strysko | Jan. 22, | 1952 |
| 2,596,330 | Everard | May 13, | 1952 |
| 2,674,490 | Richards | Apr. 6, | 1954 |
| 2,779,937 | Pellerin et al. | Jan. 29, | 1957 |
| 2,816,184 | Manning et al. | Dec. 10, | 1957 |
| 2,851,099 | Snoddy | Sept. 8, | 1958 |
| 2,875,428 | Griswold | Feb. 24, | 1959 |
| 2,878,867 | Webb | Mar. 24, | 1959 |